O. E. MERRELL.

PROCESS FOR OBTAINING THE SOLIDS FROM LIQUIDS.

APPLICATION FILED FEB. 16, 1916.

Reissued July 22, 1919. 14,693.

WITNESSES:
H. W. Hurst
E. A. Thompson

Oliver E. Merrell
INVENTOR
BY Monroe P. Davison
ATTORNEY.

UNITED STATES PATENT OFFICE.

OLIVER E. MERRELL, OF SYRACUSE, NEW YORK, ASSIGNOR TO MERRELL-SOULE COMPANY, OF SYRACUSE, NEW YORK, A CORPORATION OF NEW YORK.

PROCESS FOR OBTAINING THE SOLIDS FROM LIQUIDS.

14,693. Specification of Reissued Letters Patent. Reissued July 22, 1919.

Original application filed March 29, 1910, Serial No. 522,223. Divided and application filed February 16, 1912, Serial No. 678,142. Original No. 1,136,356, dated April 20, 1915. Application for reissue filed February 16, 1916. Serial No. 78,736.

*To all whom it may concern:*

Be it known that I, OLIVER E. MERRELL, a citizen of the United States, and resident of Syracuse, in the county of Onondaga, in the State of New York, have invented new and useful Improvements in Processes for Obtaining the Solids from Liquids, of which the following, taken in connection with the accompanying drawings, is a full, clear, and exact description.

This invention relates to a process for obtaining the solids from organic liquids, in the form of a substantially dry powder, which may be returned again to its original liquid form by the addition of a suitable amount of water, without the loss of the distinguishing characteristics of the original liquid, and is a division of application filed March 29, 1910, No. 522,223, issued in Patent No. 1,072,391.

This invention is especially applicable to and intended for the drying of organic liquids having a high moisture-content, such as milk and eggs. If milk is treated, it may be in its original condition, or the cream may be first removed; and, in either case, the milk (whole or skimmed) may be condensed or concentrated before subjecting it to the desiccating operation. Cream may also be dried to a powder by the new process.

The organic liquid is subjected to the intimate action of a whirling current of moisture-absorbing air, sufficient in quantity to take up and carry off the moisture-content of the liquid, the spirally forward motion imparted to the air current causing the air to disintegrate the liquid and break it up into excessively fine particles in the nature of a cloud or mist, with the result that the moisture is removed from the solids and absorbed by the air in a practically instantaneous manner, leaving the dry solids to collect separately from the moisture-laden air current.

The present invention consists in a desiccating process carried out in an economical and efficient manner for the production of a dried powder, particularly from organic substances such as milk and eggs, in which it is essential that the normal characteristics be substantially preserved, and involves the utilization of the entire amount of heated air introduced into the desiccating chamber in disintegrating and breaking up the liquid, as well as carrying forward and desiccating the same, and, as in the apparatus disclosed, contemplates the introduction of the entire body of air through the spraying or atomizing device, with the result that the heated air is thoroughly commingled with the atomized milk and the evaporation of the liquid constituents is completed before the atomized particles contact with the walls of the chamber, and the essential separation of the dry powder from the air before condensation of the vapor carried by the same occurs. The latter feature is essential to the success of any desiccating process.

The process specifically contemplates the passage of the entire body of heated air through the atomizing device and its projection into the desiccating chamber through an orifice surrounding the milk delivery pipe, so that the entire body of air is utilized in atomizing and minutely disintegrating the liquid while accomplishing, simultaneously, the desiccation of the same.

Suitable apparatus for carrying out the new process is illustrated in the accompanying drawings, wherein—

—1— is an ordinary pressure blower, fan, or other means for forcing air through a conduit —2— which is preferably flattened at —3—, as it approaches the tangential entrance —4— to a cylinder or air whirling chamber —5—. One end of the air whirling chamber —5— is contracted and opens at —6— and enters the desiccating chamber —7—, said desiccating chamber having a suitable screened air outlet, as by having upon one side a screen —8— of fine bolting cloth, or similar material, through which the air and vapor pass off while the solids gravitate to the floor, where they may be removed in any convenient way.

The cylinder —5— and pipe —10— constitute the atomizing device, the milk being introduced through pipe —10— and the air through cylinder —5—, whereby the entire body of air is utilized in simultaneously atomizing and desiccating the liquid. The preconcentration of the milk may be accomplished in any known manner and by means of any known apparatus, not herein necessary to further illustrate or describe.

Figure 1:
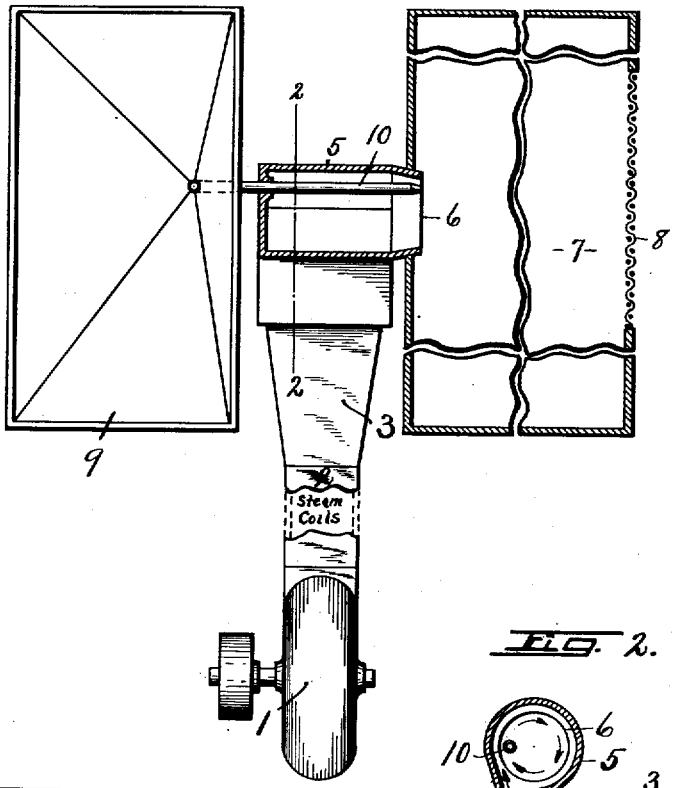
Figure 1 is a top plan of the apparatus partly in section.
Figure 2:
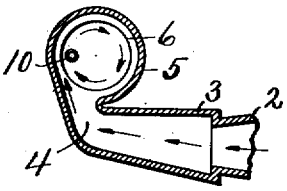
Fig. 2 is a vertical section on line 2—2, Fig. 1.
Figure 3:
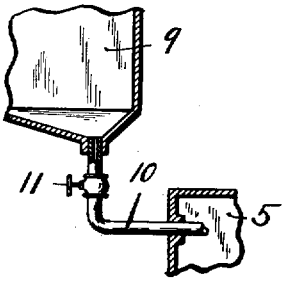
Fig. 3 is a detail section.
Figure 4:
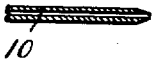
Fig. 4 is a detail section of the discharge end of the liquid supply pipe.

The organic liquid to be desiccated is contained in a receptacle —9—, preferably raised slightly above the supply-pipe —10— so that the liquid may flow through said supply-pipe by gravity, and may flow out in a stream or in drops. The supply-pipe is provided with an ordinary control valve —11—. The discharge end of pipe —10— is beveled to a sharp edge as shown in Fig. 4. The supply-pipe —10— passes into the air whirling chamber —5— at any convenient point and several pipes may be used, conditioned upon the quantity and the moisture absorbing properties of the air used, but the open end of the supply-pipe —10— should coterminate substantially with the open end of the chamber —5—, and preferably placed eccentrically thereto. The air is passed through the conduit —2— into the chamber —5—, at a pressure of a few ounces to the square inch. In passing from the blower to the air whirling chamber the air passes around heating surfaces, such as coils of steam pipes, which are not shown. The air enters the air whirling chamber tangentially and takes a spiral or whirling path, as indicated and finally emerges through the contracted open end —6— of the air whirling chamber into the desiccating chamber, where it continues its whirling motion transversely to the path of the inflowing stream of liquid, thereby disintegrating or breaking up the liquid into fine particles as it emerges from the open end of the pipe —10— and converting it into a mist and simultaneously absorbing the moisture, the separated solids gravitating to the bottom of the desiccating chamber, and the air and vapor passing out through the fine screen —9—, or other suitable screened collector.

There is a tendency to produce a back flow of air in the central portion of the open end of the air whirling chamber. If the end of the supply-pipe terminated in this central portion, the emerging liquid would be drawn backward somewhat, and toward the periphery of the air whirling chamber before being whirled into the desiccating chamber by the spiral current of air, so that some of the liquid might collect on the walls of the air whirling chamber. To avoid this, the discharge end of the supply-pipe —10— is eccentric to the open end of the chamber —5— and near the periphery of the outlet opening —6—, so that the rapid current of air more effectively engages with and breaks up the liquid as it emerges from the end of the supply-pipe, thereby whirling it into the desiccating chamber and causing the disintegration and desiccation. It will be understood, however, that the process may be operated by locating the supply-pipe centrally to the outlet —6—, though the maximum disintegrating effect is produced as aforesaid, by locating the end of the supply-pipe near the periphery of said outlet.

The size of the chamber —5— and the pressure and quantity of air passing through it, and the moisture-absorbing condition of such air, are so regulated as to furnish a sufficient quantity of air to thoroughly remove the moisture from the liquid passing through the supply-pipe. Air which has been heated or subjected to special treatment to render it moisture-absorbing may be used, but ordinary atmospheric air is efficient to carry out the process.

In order that the process may be fully understood, the details of one practical installation will be given. A pressure blower is employed having a blower discharge five and one-fourth (5.25) inches in internal diameter, and the blower speed is three thousand nine hundred (3,900) revolutions a minute. This requires about one and one-half (1.5) horse power. A pressure of seven (7) ounces per square inch is produced, and air is delivered at the rate of about six hundred and fifty cubic (650) feet per minute. The air is passed over steam coils in which there is a steam pressure of ninety to one hundred (90 to 100) pounds per square inch, and the average temperature within the desiccating chamber is one hundred and sixty-four (164) degrees Fahrenheit. The internal diameter of the air whirling chamber —5— is six (6) inches, and the internal length of the cylindrical part is nine (9) inches. The intake —4— to the chamber —5— is two (2) inches across and of the length of the cylindrical part of said chamber. The diameter of the outlet opening —6— is five (5) inches. The supply-pipe —10— has an internal diameter of one thirty-second (.03125) of an inch, and the head is such that it delivers twenty-two (22) pounds of milk or other organic liquids in an hour. The desiccating chamber is six (6) feet high, is nine (9) feet long from the air outlet —6— to the opposite wall, and is six (6) feet wide. These details are subject to variation depending upon practical conditions, such as the initial dryness of the air, the amount of moisture in the milk or other organic liquid, the quantity to be treated, and the pressure in the steam coils.

The quantity of air is large in proportion to the liquid treated, and its disintegrating capacity is due to its rotation under pressure and at high velocity. In this connection the contraction of the outlet —6— is important since it retards the escape of the air into the desiccating chamber, and hence contributes to the desired whirling motion.

The whirling motion of the air not only disintegrates the liquid and subjects it to a large volume of air, but also prolongs the contact between the air and the liquid, delaying the effect of gravity so that complete drying takes place. As the result a relatively small drying chamber can be used.

This invention is not limited to a process in which the inflowing stream of liquid is constant for it may be carried out in a satisfactory manner by allowing the liquid to emerge from the end of the supply-pipe intermittently, as in drops or jets.

The invention consists in a new process, whereby organic liquids of high moisture-content may be disintegrated and desiccated solely by the agency of a spiral or whirling current of air.

What I claim is:—

1. The process of desiccating liquids consisting in disintegrating and desiccating the liquid solely by the action of a rotating current of moisture absorbing air.

2. The process of desiccating liquids consisting in disintegrating and desiccating the liquid solely by the action of a rotating current of air which absorbs the moisture of the liquid, and collecting the dry solids separated from the moisture-laden air.

3. The herein described process of desiccating liquids consisting in disintegrating and desiccating the liquid solely by means of a current of moisture-absorbing air having a spirally forward motion.

4. The process of obtaining the solid constituents of liquids and semi-liquids in the form of a substantially dry powder, consisting in creating a current of air having a spirally forward motion, introducing the liquid into the whirling current at substantially the vortex thereof and eccentrically of the axis of movement of said current whereby the liquid is held in suspension and the liquid constituents vaporized.

5. The herein described process of desiccating liquids consisting in introducing the liquid into a current of moisture-absorbing air having a spirally forward motion, in such a manner that the liquid is both broken into spray and is desiccated solely by the action of the whirling current.

6. The process of producing desiccated milk powder which comprises removing a portion of the water contents of the milk by evaporation, atomizing the concentrated milk in a chamber, introducing sufficient heat to desiccate the milk by a current of heated air introduced through the atomizer and separating the desiccated milk from the air and water vapor.

7. The process of producing desiccated milk powder which comprises removing a portion of the water contents of the milk by evaporation, atomizing the concentrated milk by means of an excess of heated air in a chamber thereby utilizing the air employed to atomize the condensed milk as a carrier for all the heat necessary to desiccate the condensed milk and separating the desiccated milk powder from the air and water vapor.

8. The process of producing desiccated milk powder which comprises concentrating the milk, atomizing the heated concentrated milk by means of an excess of heated air thereby utilizing the air employed to atomize the condensed milk as a carrier for all the heat necessary to desiccate the condensed milk and discharging the air and water vapor separated from the desiccated powder.

9. The process of producing desiccated milk powder which comprises atomizing the milk by means of an excess of heated air thereby utilizing the air employed to atomize the condensed milk as a carrier for all the heat necessary to desiccate the condensed milk and separating the desiccated milk powder from the air and water vapor.

10. The process of producing desiccated milk powder which comprises concentrating milk, simultaneously atomizing and desiccating the concentrated milk by an excess of heated air introduced through the atomizer with a spirally forward movement and separating the powder from the air and vapor.

In witness whereof, I have hereunto set my hand this 12th day of February, 1916.

OLIVER E. MERRELL.

Witnesses:

M. Viola Howland,

Eugene P. Thompson.